Figure 1:
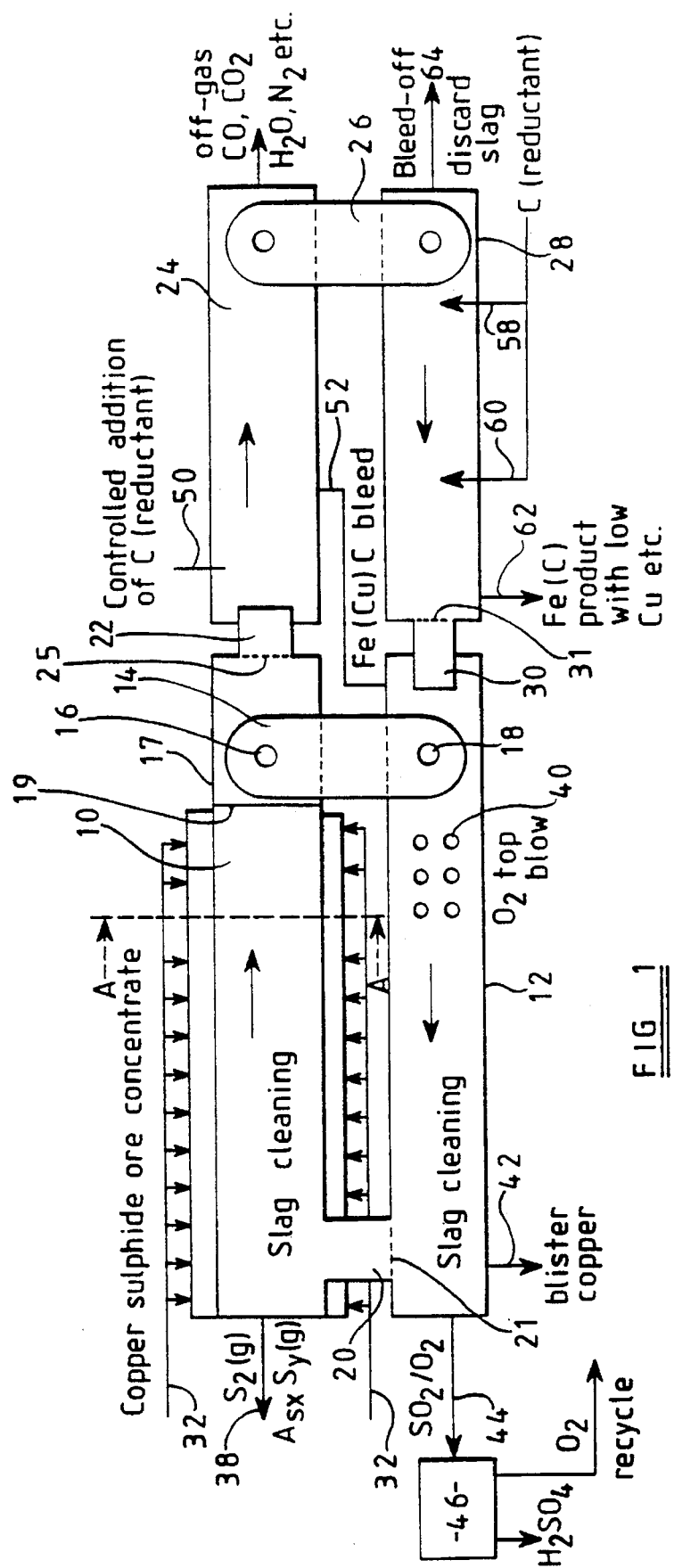

United States Patent [19]
Warner

[11] Patent Number: 5,607,495
[45] Date of Patent: Mar. 4, 1997

[54] OXYGEN SMELTING OF COPPER OR NICKEL SULFIDES

[75] Inventor: Noel A. Warner, Birmingham, Great Britain

[73] Assignee: The University of Birmingham, England

[21] Appl. No.: 338,638

[22] PCT Filed: May 21, 1993

[86] PCT No.: PCT/GB93/01053

§ 371 Date: Apr. 27, 1995

§ 102(e) Date: Apr. 27, 1995

[87] PCT Pub. No.: WO93/24666

PCT Pub. Date: Dec. 9, 1993

[30] Foreign Application Priority Data

May 23, 1992 [JP] Japan .................................. 4-11053

[51] Int. Cl.⁶ .......................... C21B 11/00; C22B 15/00; C22B 23/00
[52] U.S. Cl. ................... 75/502; 75/629; 75/643; 75/656; 75/696
[58] Field of Search ............. 75/643, 629, 502, 75/656, 696

[56] References Cited

U.S. PATENT DOCUMENTS

| 4,334,918 | 6/1982 | Warner | 75/643 |
| 4,701,217 | 10/1987 | Warner | 75/500 |

Primary Examiner—Melvyn Andrews
Attorney, Agent, or Firm—Andrus, Sceales, Starke & Sawall

[57] ABSTRACT

Copper and or nickel sulfide ore concentrates of high intrinsic value are oxygen smelted by introducing such concentrates via feeds (32) into a closed loop extraction circuit in which a molten sulphide carrier composition is forcibly circulated by an R-H unit (14) through lower hearth (10) at which feed of the concentrates takes place, and upper hearth (12) at which controlled oxidation with technically pure oxygen through top lances (4) takes place to oxidize copper sulphide and iron sulphide in the concentrate to iron oxide. Copper is removed via line (42). Slag containing iron oxide is discharged via weir (22) into a secondary circuit in hearths (24 and 28). Carbonaceous reductant added to the slag in (28) reduces the iron oxide in the slag to hot iron product.

13 Claims, 2 Drawing Sheets

OXYGEN SMELTING OF COPPER OR NICKEL SULFIDES

This invention relates to the oxygen smelting of copper sulphide ore concentrates, nickel sulphide ore concentrates or bulk copper and nickel sulphide ore concentrates, and is particularly concerned with the direct oxygen smelting of those of such concentrates which have a high intrinsic energy value.

Existing copper smelting technologies include:

Top Blown Rotary Converting

Electric Smelting

Noranda Continuous Smelting

Mitsubishi Continuous Smelting

Inco Flash Smelting

Outokumpu Flash Smelting

For those concentrates with relatively low intrinsic energy value (i.e. those where large net amounts of exothermic heat are not generated), high level oxygen enrichment can be used with the above technologies, and in certain cases depending both on the existence of high copper/sulphur ratio and a low sulphide iron content in a bornitic concentrate, it is possible to produce blister copper directly in a single step using technically pure oxygen ie oxygen of commercial purity (95% or higher).

Typical chalcopyrite copper concentrates, on the other hand, when oxidised directly to blister copper, generate reaction heat in excess of that required for autogenous operation, even at low levels of oxygen enrichment. The inability to dissipate this additional heat with current used technology prevents or complicates the use of higher levels of oxygen enrichment.

Besides the excess heat generation problem already referred to, single step smelting of copper concentrate with relatively high levels of certain impurity elements (Arsenic, Antimony and Bismuth) tend to produce final blister copper with unacceptable levels of these impurities because their elimination is generally lower than by conventional smelting routes. As a consequence direct smelting to blister copper has to date been restricted to relatively clean concentrates.

GB-A-2048309 (corresponding to EP-A-016595 and U.S. Pat. No. 4,334,918) discloses a process for recovering nonferrous metals from their sulphide ores wherein a molten sulphide carrier composition (or matte) is forcibly circulated through an extraction circuit from which the non-ferrous metal or its sulphide can be continuously extracted at an elevated temperature. The method involves introducing the sulphide ore into the matte at an ore-receiving station so that the ore is dissolved in or melted by the matte, and contacting the matte containing said ore with oxygen at an oxidation station so as to oxidise at least part of the ore and/or the matte, heat generated during the oxidation step being recovered by the matte and transmitted thereby to endothermic sites in the circuit. GB-A-2048309 is not so concerned with copper sulphide ore concentrates having a high intrinsic energy value, but it does disclose the treatment of a copper-zinc ore concentrate containing 25.6% copper, 10% zinc, 1.7% lead, 24% iron and 33% sulphur. With such an ore concentrate, oxidising is effected in an oxidising unit divided into first and second parts wherein a major part of the matte passes through the first part and is oxidised by oxygen lances located above the circulating stream, the oxidation being controlled so that only preferential oxidation of the ferrous sulphide occurs. A minor portion of the matte is directed through the second part where it is top blown with oxygen-enriched air so that both Iron and copper. sulphides are oxidised to produce a molten copper phase as well as a slag phase containing iron oxides and some dissolved cuprous oxide. The molten copper phase produced in the second part is separated so that part can be extracted as blister copper and the remaining fed back to a de-zincing vessel. After passing through the second oxidising part, the remaining matte and slag phases are re-mixed in a cascade fashion with the main matte stream in a slag cleaner, with coal being introduced into the re-mixing region so as to reduce the oxygen potential of the slag and hence decrease the solubility of the cuprous oxide in the slag. Further slag cleaning is provided by addition of iron pyrites to the slag. It will be appreciated that, because such a copper-zinc ore concentrate has a relatively high zinc content, it cannot be regarded as an ore concentrate having a high intrinsic energy value.

EP-A-0266975 (corresponding to U.S. Pat. No. 4,701, 217) discloses an analogous melt circulation process for reducing oxides of copper and nickel or copper, nickel and cobalt in deepsea manganese nodules using circulating copper nickel sulphide matte and a suitable carbonaceous reductant (eg partly devotatilized coal), and also discloses the possibility of mixing such nodules with additional copper which may be in the form of a copper-bearing mineral such as chalcopyrite, or scrap copper in order to ensure that phase separation of a nickel-copper or nickel-cobalt-copper alloy takes place.

It is an object of the present invention to provide an improved method of direct oxygen smelting of copper sulphide ore concentrates, nickel sulphide ore concentrates or bulk copper and nickel sulphide ore concentrates (hereinafter simply referred to as copper/nickel sulphide ore concentrate) which can enable reduced Gas emissions to be achieved whilst at the same time permitting effective use of the high intrinsic energy of such ore concentrates.

According to the present invention, there is provided a method of oxygen smelting of a copper/nickel sulphide ore concentrate of high intrinsic energy value, comprising the steps of forcibly circulating a molten sulphide carrier composition through a closed loop extraction circuit from which copper/nickel or sulphide(s) thereof can be continuously extracted at an elevated temperature, introducing the ore concentrate into the molten carrier composition at an ore receiving station so that the ore is dissolved in or melted by the composition, contacting the molten carrier composition containing said ore with an oxidising gas containing at least 30 vol % oxygen at an oxidation station so as to oxidise at least part of the ore and/or the molten carrier composition, and utilising heat generated during the oxidation step as a result of oxidation of the ore concentrate.

Most preferably, the oxidising gas is technically pure oxygen, although an oxidising gas having a lower oxidising potential may be employed if circumstances permit.

in one embodiment, the generated heat is utilised by smelting the copper/nickel sulphide ore concentrate of high intrinsic energy value with another mineral concentrate of low or negative intrinsic energy value, eg high-grade zinc concentrate, high-grade lead concentrate or even a bulk flotation concentrate containing both lead and zinc, preferably low in gangue oxides for highest thermal efficiency, but not necessarily restricted to high grade concentrates if metallurgical efficiency dictates otherwise. With such a process, metallic copper, metallic zinc and metallic lead can all be obtained as products in the primary smelting circuit employing forced circulation of copper/nickel sulphide through various extraction zones, following the teachings of GB-A-2048309. The primary zinc and/or lead formation reactions consume thermal energy and so, if the ore concentrates are added in the correct proportions, the excess energy released on direct smelting of copper/nickel concentrate using technically pure oxygen can be balanced against the endothermic requirements of zinc and/or lead production. This has the advantage that the energy required for zinc and lead production is provided in situ within the smelter so that no external fuel is required and all the benefits of virtually zero gas emission smelting are secured. Preferably, copper is extracted as the metal, whilst nickel is extracted as high grade nickel sulphide.

The use of technically pure oxygen or oxygen enriched air as opposed to air has the advantage that it is not necessary to treat large quantities of nitrogen to remove entrained pollutants such as oxides of nitrogen, oxides of sulphur and volatiles such as arsenic, antimony and bismuth before discharge.

It will be appreciated than the large amounts of oxides of sulphur which result from the process using technically pure oxygen are relatively undiluted with other gases and can therefore be relatively easily converted to sulphuric acid.

Since copper/nickel sulphide ore concentrates also contain appreciable quantities of iron, the method of the invention produces relatively large quantities of slag as a major waste product. It is possible using the method of the present invention to reduce the quantity of slag substantially by reducing the iron oxide in the slag to form iron metal, thereby enabling the recovery of iron by utilising at least part of the excess heat generated during oxidation of copper/nickel sulphide to provide the necessary energy for the endothermic conversion of iron oxide to iron. This can conveniently be conducted by employing a secondary circuit utilising the molten slag phase removed from the primary extraction circuit for copper/nickel or sulphide(s) thereof.

By using such a technique to recover iron as a marketable product from the slag, the mass of slag finally discarded as waste and its content of deleterious elements can be very substantially reduced and thus more easily meet increasingly stringent legislation on waste disposal.

In the secondary circuit, the molten slag is contacted with a suitable reductant, eg, coal, coke, lignite or natural gas, to produce a liquid iron product which contains some dissolved carbon, such liquid iron product accumulating below the slag on the hearth of the secondary circuit. This liquid iron product can be tapped off intermittently or arranged for continuous removal via a siphon-type continuous tapper of the type used in blast furnace operations. By allowing the liquid iron product to accumulate as a continuous layer covering the entire furnace hearth, the deleterious effects of chemical attack by the normally aggressive liquid slag and erosion of the refractory lining of the furnaces is thereby prevented. Vertical walls and/or partitions employed in this secondary circuit can be conveniently. protected from erosion and chemical attack by freezing a protective slag lining on these areas by water cooling such walls and/or partitions. Because the slag melt is continuously circulating through the secondary circuit and overflowing back to the primary extraction circuit, the depth of melt can be kept to a minimum and thus the area exposed no water cooling is relatively small as compared with the larger hearth areas protected with the hot metal layer, which does not require forced water cooling but may, if necessary, be cooled more moderately by forced air circulation or natural convection.

As will be appreciated from the above, all the energy requirements for effecting the chemical reduction of the slag to metallic iron are derived from the surplus exothermic heat released in the primary extraction circuit. This surplus exothermic heat is picked up by the slag and transferred to the secondary circuit by forced circulation. Whilst in the secondary circuit, there is no requirement for a massive reduction in the iron oxide content of the slag as it is normally circulated at a rate many times of that of the iron production rate so that the overall temperature drop of the slag phase in passing through this secondary circuit is relatively small, typically not more than 50° C., although in certain cases there may be somewhat higher levels of temperature change, depending principally on the level of temperature required in the non-ferrous smelting circuit and also the liquidus temperature of both the slag and the molten iron/carbon alloy formed in the secondary circuit. Because the change in iron oxide concentration is relatively small, the steady state concentration of iron in the slag can be maintained at a high level, thereby permitting favourable reduction kinetics to be established and thereby permitting high productivity.

Once the secondary circuit is established, no further siliceous or other flux is normally required to be. added. All that is happening is that the iron content of the slag is increased to a small extent in the iron slagging zone. By not having to add cold solid fluxing agents continuously, appreciable savings in process energy are achieved. As the gangue oxides introduced into the slag build up to a steady slate level, a small proportion is removed to bleed off non only these oxides introduced into the slag in the non-ferrous loop but also those derived from the coal ash slag in the secondary circuit.

Because the iron in the slag is already principally in the ferrous state by the time it is removed from the primary (extraction) circuit and because it is already at high temperature, the carbon requirements for iron production by this technique are considerably less than any other iron-making technology. The carbon monoxide primary gaseous product, containing some carbon dioxide and coal volatiles (if coal is used), is more than sufficient to fire a waste heat boiler by combustion with air of relatively moderate preheat whereby the steam so produced is enough to generate the electricity requirements of air separation to oxygen and nitrogen. The oxygen is produced at a rate sufficient to supply the requirements of direct oxygen smelting of the copper/nickel sulphide and other mineral sulphides fed into the non-ferrous smelting circuit.

It is possible for so-called "tramp elements" to build up in the iron produced because such tramp elements are carried over in the slag from the primary smelting circuit. By circulating the iron-containing slag as described above, the build-up of tramp elements in the iron may be mitigated by restricting the amount of reductant added to the upstream part of the secondary circulation circuit. In doing so, the hot metal initially formed collects the residual copper and other reducible element impurities that leave the primary extraction circuit dissolved in the slag. By collecting this initial small amount of hot metal and returning it to the primary extraction circuit (probably intermittently by tapping off this "front-end" hot metal which is not allowed no mix with the major portion of the hot metal), the non-ferrous metals so recovered are usefully returned to the non-ferrous loop without creation of a waste or by-product stream. Following this initial reduction with a restricted amount of reductant, the slag melt is then contacted with further reductant to produce a low-impurity, high quality hot metal. This advantage cannot be achieved using conventional bath smelting technology because the extensive back mixing involved in such processes.

Particularly in the case where the ore concentrate being used as feed contains impurities such as arsenic and antimony, it is preferred to subject such ore concentrate, possibly but not necessarily in crude pelletised form to facilitate solids charging and assimilation into the circulating sulphide material, to direct thermal radiation from the circulating matte/slag surface at high temperature before assimilation thereof into the matte. This radiant pre-heating of the feed solids occurs within the refractory enclosure and permits the so-called "labile" sulphur to be evolved from the solids under neutral or reducing conditions. The sulphur gas thus emitted takes with in arsenic and antimony sulphides which are released from the solid charge whilst undergoing pretreatment. By the time the solids are assimilated into the circulating matte, the level of impurities in the feed solids is reduced to such a low level that the final non-ferrous product (eg blister copper) is well within the specification for these impurity elements. Because of the high thermodynamic copper activity in the melt of single step copper production processes, there is little scope for arsenic and antimony elimination from the matte once these elements have entered it. Thus, the radiant pre-heating technique described above prevents arsenic and antimony from entering the matte and enables them to be eliminated as a gaseous species along with the elemental sulphur the gas reduced from the reducing side of the circuit. If desired, these gaseous species may be partially separated from the sulphur prior to condensation.

In the accompanying drawings

Figure 2:
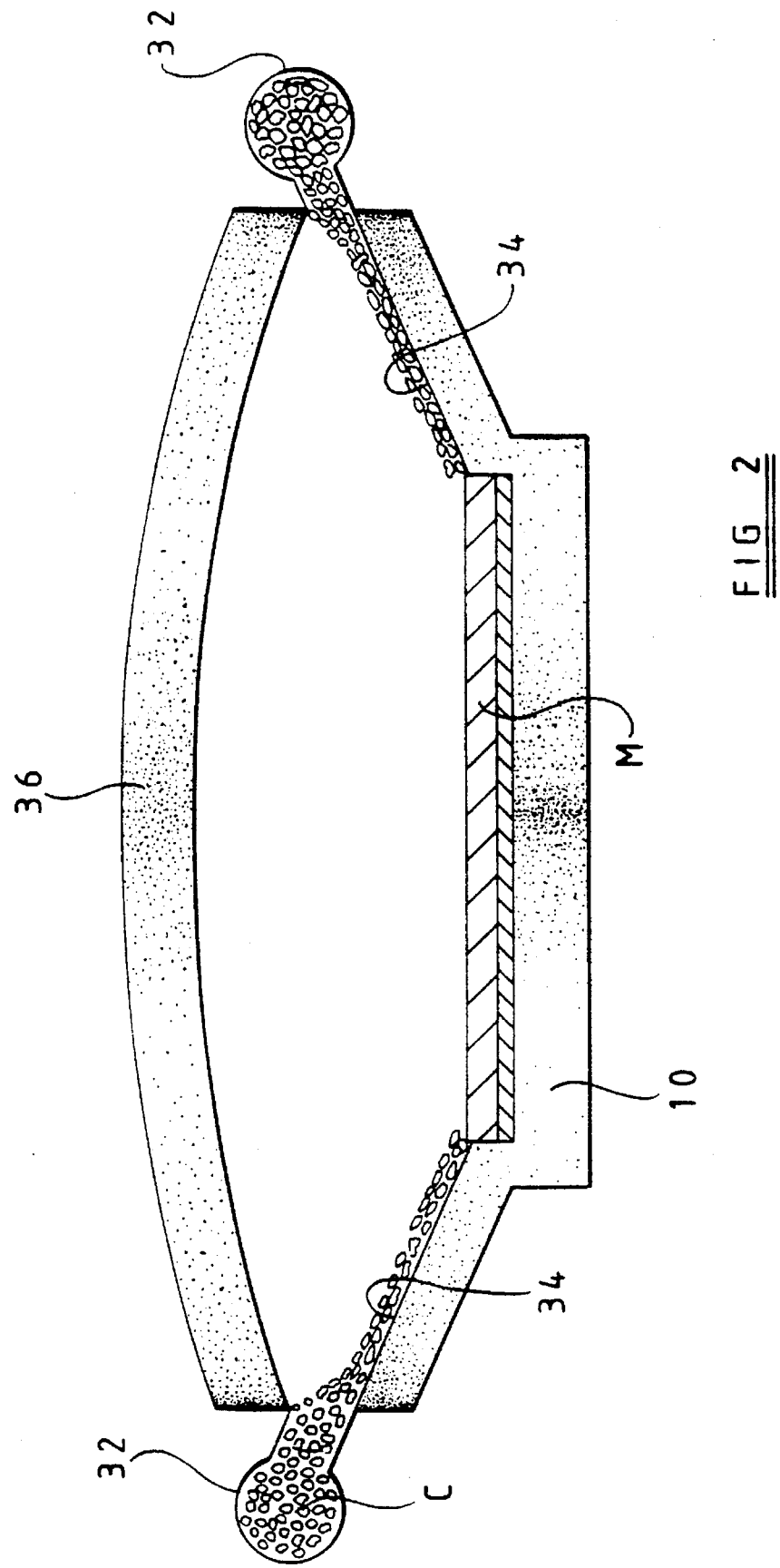

FIG. 1 is a schematic view showing a method and apparatus for direct oxygen smelting of a copper sulphide ore concentrate of high intrinsic energy value to produce blister copper and to recover iron therein as an iron-carbon (liquid metal) product with low amounts of discard slag, and FIG. 2 is a cross-section on the line A—A of FIG. 1.

Referring now to FIG. 1 of the drawings, a primary closed loop extraction circuit 10 for a molten carrier material (matte) of copper sulphide containing FeS and other metal sulphides is established through first and second hearths 10 and 12 by means of an R-H degassing unit 14 having an inlet snorkel 16 extending into the molten matte in a slag separation zone 17 of the first hearth 10 and an outlet snorkel 18 which supplies molten matte into the second hearth 12. The slag separation zone 17 is connected with the remainder of the first hearth 10 by an overflow weir 19 for matte and slag. Molten matte circulates back to the first hearth 10 from the second hearth 12 via a connecting passage 20 fitted with means such as a gas (eg nitrogen) curtain 21 for preventing the gases in the respective hearths 10 and 12 from intermixing.

The slag separation zone 17 has an overflow weir 22 for discharging slag from the first hearth 10 of the primary circuit to one end of a first hearth 24 of a secondary smelting circuit. The weir 22 is fitted with means such as a gas (eg nitrogen) curtain 25 for preventing gas in the hearths 10 and 24 from intermixing. An R-H unit 26 serves to transfer slag from the first hearth 24 into one end of a second hearth 28 of the secondary smelting circuit. The opposite end of the second hearth 28 is higher than the second hearth 12 of the primary circuit and discharges into the latter via weir 30 fitted with means such as gas (eg nitrogen) curtain 31 to prevent gases in the respective hearths 28 and 12 from intermixing.

Pelletised copper sulphide ore concentrate C containing iron (eg chalcopyrite) is passed via multiport feeds 32 into either side of the first hearth 10 of the primary smelting circuit. The ore concentrate C moves down sloping side walls 34 (see FIG. 2) of the first hearth 10 for a substantial distance as a relatively thin layer before entering the layer of molten matte M which is circulating at high rate through the first hearth 10. During its passage down the sloping walls 34, the pellets of ore concentrate C are exposed to radiant heat within the first hearth 10 which, like the other hearths 12, 24 and 28, is rendered substantially gas tight by a refractory roof 36. Instead of using sloping side walls 34, the ore concentrate C may be transported using a heat-resistant belt conveyor within the high temperature region of the hearth 10, which takes the concentrate C along the entire length of the hearth 10 before discharge into the circulating copper matte. The ore concentrate C is thereby heated to a temperature of about 1000 K., at which temperature labile sulphur is volatilised as sulphur vapour and arsenic, antimony and bismuth present as impurities in the ore concentrate C are also volatilised in the form of their sulphides. Such vapours are removed from first hearth 10 via line 38 leading to a condenser (not shown). The ore concentrate 34, from which the arsenic etc have been volatilised, dissolves in and is melted by the circulating layer of molten matte M and passes over weir 19 together with slag and into the slag separation zone 17. The matte is then transferred to the second hearth 12 through the R-H degassing unit 14. Since the inlet snorkel 16 extends below the layer of slag which has formed on top of the molten matte layer M, relatively clean matte is transferred to the second hearth 12 by the R-H unit 14. Slag overflows from zone 17 via weir 25 into the first hearth 24 of the secondary smelting circuit.

The molten matte M transferred to the second hearth 12 of the primary smelting circuit and which contains the dissolved ore concentrate C is then subjected to oxidation using technically pure oxygen supplied through top lances 40. Such oxidation is controlled so as to convert the copper sulphide to copper metal and to convert the iron sulphide in the ore concentrate C to ferrous oxide. The copper produced is bled off via line 42 as blister copper whilst the matte layer masses back to the first hearth 10 via passage 20. Slag cleaning operation (eg using iron pyrites) is effected at this location in hearths 10 and 12. Sulphur dioxide produced during the oxidation step and any excess unreacted oxygen are passed via line 44 at the downstream end of hearth 12 to a sulphuric acid production unit 46, the separated oxygen being recycled back to the lances 40 to be mixed with fresh technically pure oxygen. A relatively slow-moving layer of molten copper is maintained in the hearths 10 and 12 below the rapidly circulating molten matte M so as to protect the hearths against severe erosion which would otherwise occur if the circulating matte M were directly in contact with the hearth.

Whilst the above-described production of blister copper is taking place, slag containing large amounts of iron in ferrous form is circulating through first hearth 24 and second hearth 28 of the secondary smelting circuit. At the upstream end of the first hearth 24, a controlled addition of carbonaceous reductant is made through line 50 in an amount such as to reduce any copper oxides which have been carried over by the slag to copper. This separates out below the layer of slag and is bled back to the upstream end of second hearth 12 via bleed line 52. To inhibit erosion of the hearths 24 and 28 of the secondary smelting circuit, a layer of liquid metal Fe (C) is maintained therein below the slag layer and walls and partitions of the hearths 24 and 28 are water cooled so as to cause a layer of solid slag to adhere thereto and protect these parts against erosion and corrosion. The slag which has been subjected to controlled reduction then passes along first hearth 24 to be transferred via R-H unit 26 into the second hearth 28. Further carbonaceous reductant is added to the slag in hearth 28 via lines 58 and 60 which are spaced apart longitudinally of the second hearth 28. The carbonaceous reductant introduced via lines 58 and 60 serves to reduce ferrous iron in the slag no iron metal containing carbon (hot metal) which is bled off at the appropriate rate via line 62 as hot metal product containing low amounts of impurities such as copper. However, if the copper level is unacceptably high, the hot metal may be de-coppered by sub-surface injection of sodium sulphate. This is reduced by the carbon in the melt to form a sodium sulphide slag which in turn extracts both copper and sulphur from the molten iron to form a slag of $Cu_2S$ dissolved in $Na_2S$. After separating the slag from the refined molten iron, the sodium sulphate can be regenerated from the slag by air injection, leaving two immiscible liquid layers, molten sodium sulphate and molten $Cu_2S$, the latter being returned directly to the copper smelting circuit. Discard slag is bled off via line 64 at the upstream end of second hearth 28.

Since the slag in the secondary smelting circuit is circulated rapidly, the iron content of the slag remains substantially constant. This facilitates the establishment of steady-state conditions for reduction of the iron contained in the slag to metallic iron. Additionally, rapid circulation of slag through the oxidising region of the primary smelting circuit permits the large amounts of heat which are generated during the highly exothermic reaction of copper sulphide containing dissolved FeS with the technically pure oxygen to be transferred to the slag and carried thereby to the endothermic reduction reactions which are taking place in the hearths 24 and 28 of the secondary smelting circuit.

In a modification, the apparatus and method of FIGS. 1 and 2 is used to smelt a mixture of the above-described copper sulphide ore concentrate of high intrinsic energy in admixture with a high grade zinc concentrate which are mixed together and fed to inlets 32. In this process, zinc is removed as vapour from R-H vacuum degassing unit 14 and passed to a condenser (not shown) to be recovered as metallic zinc. The zinc is produced by reaction of copper metal dissolved in the circulating matte with the zinc sulphide also dissolved in the circulating matte to form copper sulphide and zinc in an endothermic reaction for which the heat is supplied from the oxidation station in hearth 12 by the circulating molten matte. Recovery of iron from the slag is effected in the manner described above. However, depending upon the energy requirements of the high grade zinc ore concentrate and the intrinsic energy of the copper sulphide ore concentrate, recovery of iron from the slag may or may not be conducted. If it is not conducted, then the secondary smelting circuit can be dispensed with.

Typical examples of high intrinsic energy copper are concentrates are:

| | (1) Inco High Grade Copper Concentrate:- | | | | |
|---|---|---|---|---|---|
| | Cu | Ni | Fe | S | $SiO_2$ |
| % wt | 30–32 | 1.1–1.2 | 29–30 | 31–33 | 2 |
| | (2) Kidd Creek Copper Concentrate:- | | | | |
| | Cu | Fe | S | Pb | Zn | $SiO_2$ |
| % wt | 26 | 28 | 31 | 0.6 | 4 | 4 |

| | | | (3) Mount Isa Mines Copper Concentrate:- | | | | | | |
|---|---|---|---|---|---|---|---|---|---|
| Cu | Fe | S | Pb | Zn | As | Bi | $SiO_2$ | $Al_2O_3$ | CaO | MgO |
| 24.6 | 29.2 | 31.9 | 0.14 | 0.34 | 0.18 | 0.01 | 9.7 | 1.06 | 0.9 | 1.13 |

The Inco material (1) above has very little gangue oxide associated with the sulphides, and the slag bleed (line 64) would need to be only about 15% of the untreated total slag mass (ie 85% saving in the slag mass to be disposed of).

Clearly as the gangue oxides in the concentrates fed to the smelter increase, the relative reduction in mass of slag effected by iron production decreases.

Nickel ore concentrates usually have a relatively high gangue oxide content compared with copper concentrates, and also the Ni/Fe ratio is substantially less than the Cu/Fe ratio. Typical examples are:

| | Ni | Cu | Fe | S | $SiO_2$ |
|---|---|---|---|---|---|
| (4) Inco Copper Cliff | 11 | 2 | 40 | 30 | 7 |
| (5) WMC Kambalda (Australia) | 13.9 | 1.1 | 27 | 26 | 17.6 |

Whilst direct production of nickel metal in a single step process is possible, it is non considered to be economically viable because of excessive nickel oxide loss to slag, unless the iron content is extremely low. Thus, with higher iron contents, it is preferred to recover the nickel as refined nickel matte which can then be direct $O_2$ smelted to produce nickel metal.

High grade zinc ore concentrates usually have very low gangue oxide contents and relatively low iron contents. Typical examples are:

| | Zn | Pb | Cu | Cd | As | Fe | S | $SiO_2$ | CaO | MgO | $Al_2O_3$ |
|---|---|---|---|---|---|---|---|---|---|---|---|
| (6) | 55.6 | 0.03 | 0.4 | 0.2 | 0.2 | 7.9 | 33 | 0.9 | 0.25 | 0.39 | 0.91 |
| (7) | 55.0 | 1.5 | 0.3 | 0.2 | 0.10 | 5.0 | 32 | 2.2 | 1.0 | 0.20 | 0.48 |

Co-smelting of either of (6) or (7) above with a chalcopyritic copper-concentrate such as (3) above permits 1 tonne Zn and 1 tonne of copper to be produced in the melt circulation reactor without external fuel input if pure technical oxygen is used, provided no iron production in the secondary circuit is attempted. Assuming that $H_2SO_4$ is produced in a single contact acid plant and that the excess $O_2$ is recycled back to the top blowing region, this leads to virtually zero gas emission smelting (some gaseous bleed-off of accumulated nitrogen or air leakage is only necessary).

To produce $Zn + Cu + H_2SO_4$ as above requires 16 GJ per 1 tonne zinc plus 1 tonne copper compared with 42 GJ per 1 tonne zinc plus 1 tonne of copper for the best available current technology assuming the overall efficiency of electricity generation is 32%, ie current technology requires about 2.6 times more energy/input.

Contact of zinc ore concentrate feed solids with the circulating iron oxide-containing slag should be avoided. Therefore, if metallic iron production is envisaged for the zinc/copper co-smelting case, the external slag loop material is added to the oxidising hearth 12 ($O_2$ top blow region) only and then returned to the secondary circuit or external slag loop without flowing through the other side (ie the first hearth 10, see FIG. 1) of the primary smelting circuit.

The R-H unit 14 may be used to effect vigorous contacting between the circulating matte and the slag recycled from the external slag loop to ensure high intensity conditions for heat transference between the slag and matte carrier systems. This can be effected by equipping the R-H unit 14 with four snorkels as opposed to the two (as illustrated in FIG. 1). Two of these would be for circulating matte, whilst two would be for slag. They could be arranged so that one or both phases are dispersed through the other to promote very high intensity heat transfer.

Instead of using the R-H unit 14 in this way, the top blow region itself can be arranged to promote efficient heat transfer between the carrier slag phase and the underlying matte phase. Attention must be paid to the slag clearing propensity of the top blow lances 40 so that a free matte surface is available under the impact. zones of the gas jets for effective reaction between $O_2$ and matte. Care will need to be exercised in this area if Zn or Pb smelting is occurring along with copper. The mass transfer of zinc sulphide dissolved in matte from the bulk to the top surface of the matte must be restricted and so it is considered advisable to effect relatively soft top blowing in the non-splash region.

It will usually be necessary in all the above-described schemes to effect in situ slag cleaning as the slag floats away from the top blow region by adding pyrite for example to the slag layer and then allowing it to settle out. However, the external slag loop provides additional safety. An intermediate iron carbon melt containing dissolved Cu and Pb in particular can be bled off and returned (see line 54—FIG. 1) to the primary matte circuit where the reaction $Fe+Cu_2S \rightarrow FeS+2\ Cu$ takes place generating copper whilst any copper originally in the slag and now in the iron bleed stream is recycled back to the main copper smelting furnace,

I claim:

1. A method of oxygen smelting of a sulfide ore concentrate of high intrinsic energy value selected from the group consisting of a copper sulfide ore concentrate of high intrinsic energy value, a nickel sulfide ore concentrate of high intrinsic energy value and a copper and nickel sulfide ore concentrate of high intrinsic energy value, comprising the steps of:

(a) forcibly circulating a molten sulfide carrier composition through a closed loop extraction circuit from which at least one product selected from copper, nickel and sulfides thereof can be continuously extracted at an elevated temperature;

(b) introducing said sulfide ore concentrate of high intrinsic energy value into said molten carrier composition at an ore receiving station so that said sulfide ore concentrate of high intrinsic energy value is dissolved in or melted by said molten carrier composition;

(c) contacting said molten carrier composition containing said sulfide ore concentrate of high intrinsic energy value with an oxidizing gas containing at least 30 volume % oxygen at an oxidation station so as to oxidize at least part of said molten carrier composition containing said sulfide ore concentrate of high intrinsic energy value; and (d) utilizing heat generated during the oxidation step as a result of oxidation of said sulfide ore concentrate of high intrinsic energy value by smelting said sulfide ore concentrate of high intrinsic energy value with another mineral sulfide concentrate of low or negative intrinsic energy value selected from the group consisting of high-grade zinc sulfide concentrate, high-grade lead sulfide concentrate and a bulk flotation sulfide concentrate containing both lead and zinc.

2. The method according to claim 1, wherein said heat utilizing step (d) also comprises reducing iron oxide in slag produced in the method to a liquid iron product; and wherein said liquid iron product is recovered.

3. A method of oxygen smelting of a sulfide ore concentrate of high intrinsic energy value selected from the group consisting of a copper sulfide ore concentrate of high intrinsic energy value, a nickel sulfide ore concentrate of high intrinsic energy value and a copper and nickel sulfide ore concentrate of high intrinsic energy value, comprising the steps of:

(a) forcibly circulating a molten sulfide carrier composition through a closed loop extraction circuit from which at least one product selected from copper, nickel and sulfides thereof can be continuously extracted at an elevated temperature;

(b) introducing said sulfide ore concentrate of high intrinsic energy value into said molten carrier composition at an ore receiving station so that said sulfide ore concentrate of high intrinsic energy value is dissolved in or melted by said molten carrier composition;

(c) contacting said molten carrier composition containing said sulfide ore concentrate of high intrinsic energy value with an oxidizing gas containing at least 30 volume % oxygen at an oxidation station so as to oxidize at least part of said molten carrier composition containing said sulfide ore concentrate of high intrinsic energy value;

(d) utilizing heat generated during the oxidation step as a result of oxidation of said sulfide ore concentrate of high intrinsic energy value by reducing iron oxide in slag produced in the method to a liquid iron product; and (e) recovering said liquid iron product.

4. The method according to claim 1, wherein said oxidizing gas is technically pure oxygen.

5. The method according to claim 3, wherein said oxidizing gas is technically pure oxygen.

6. The method according to claim 1, wherein copper is extracted as copper metal and nickel is extracted as nickel sulfide.

7. The method according to claim 3, wherein copper is extracted as copper metal and nickel is extracted as nickel sulfide.

8. The method according to claim 1, wherein said sulfide ore concentrate is exposed to radiant heat before it is introduced into said molten carrier composition so as to vaporize labile sulphur and other volatile sulfides, and wherein said vapors are removed and condensed.

9. The method according to claim 3, wherein said sulfide ore concentrate is exposed to radiant heat before it is introduced into said molten carrier composition so as to vaporize labile sulphur and other volatile sulfides, and wherein such vapors are removed and condensed.

10. The method according to claim 8, wherein said sulfide ore concentrate is exposed to radiant heat by causing it to pass down inclined walls at said ore receiving station before introduction into said molten carrier composition.

11. The method according to claim 9, wherein said sulfide ore concentrate is exposed to radiant heat by causing it to pass down inclined walls at said ore receiving station before introduction into said molten carrier composition.

12. The method according to claim 3, wherein the heat utilizing step (d) and the liquid iron product recovering step (e) are conducted in a secondary circuit utilizing a molten slag phase removed from said closed loop extraction circuit.

13. The method according to claim 12, wherein (i) reduction of said iron oxide is effected by addition of reductant to said secondary circuit, (ii) the amount of reductant added to an upstream part of said secondary circuit is restricted so that hot metal initially formed collects residual copper and other reducible element impurities that leave said closed loop circuit dissolved in the slag, and (iii) the initially formed hot metal is collected and returned to said closed loop circuit.

* * * * *

UNITED STATES PATENT AND TRADEMARK OFFICE
CERTIFICATE OF CORRECTION

PATENT NO. : 5,607,495
DATED : March 4, 1997
INVENTOR(S) : Noel A. Warner

It is certified that error appears in the above-indentified patent and that said Letters Patent is hereby corrected as shown below:

Title Page:

Delete "May 23, 1992 [JP] Japan ...... 4-11053" under "Foreign Application Priority Date" and substitute therefor --May 23, 1992 [GB] Great Britain .........9211053.5

Signed and Sealed this

Tenth Day of June, 1997

Attest:

BRUCE LEHMAN

Attesting Officer

Commissioner of Patents and Trademarks